Figure 1:
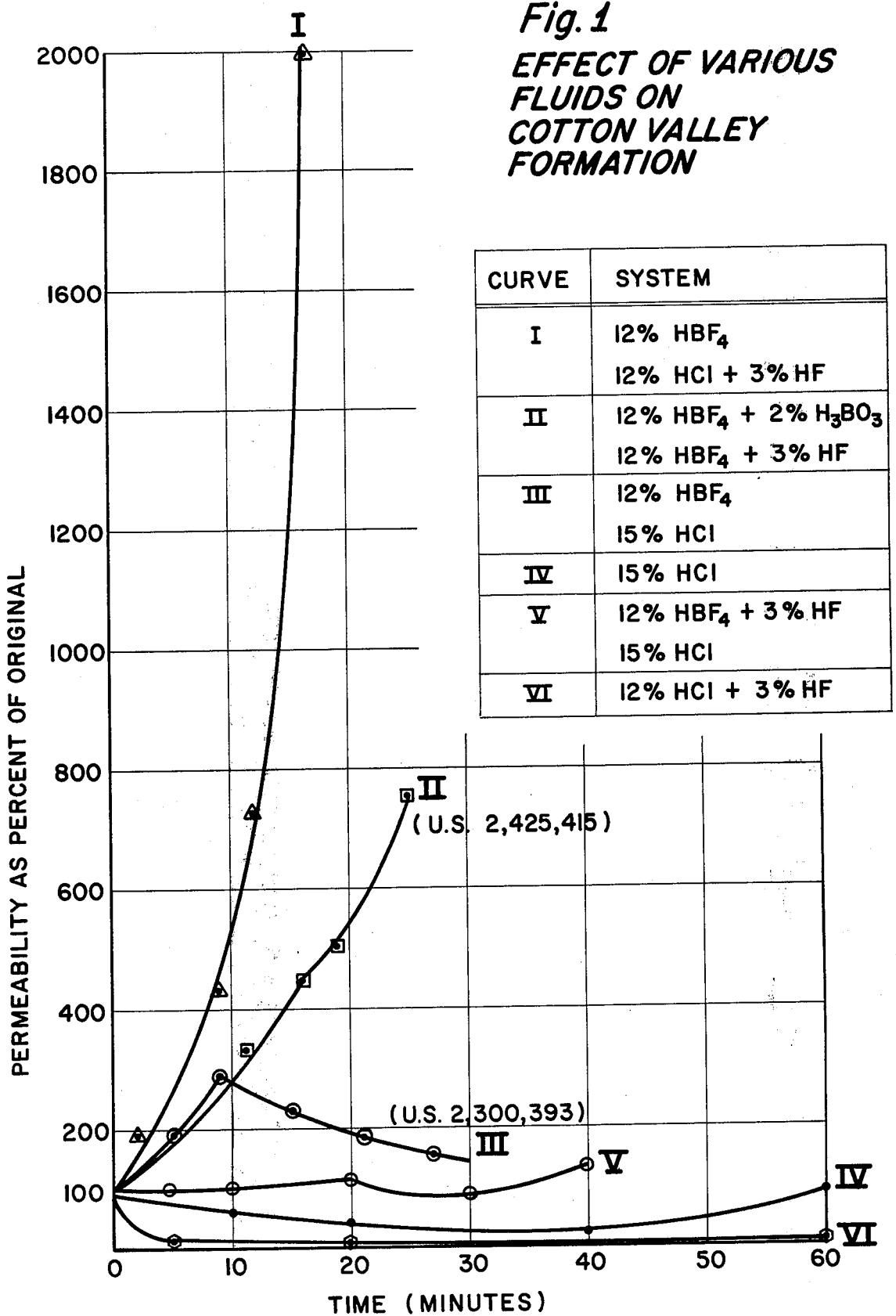

United States Patent [19]

Thomas

[11] 4,151,878
[45] May 1, 1979

[54] METHOD FOR ACIDIZING A SUBTERRANEAN FORMATION

[75] Inventor: Ronnie L. Thomas, Tulsa, Okla.

[73] Assignee: The Dow Chemical Company, Midland, Mich.

[21] Appl. No.: 824,753

[22] Filed: Aug. 15, 1977

[51] Int. Cl.$^2$ ............................................. E21B 43/27
[52] U.S. Cl. .................................................... 166/307
[58] Field of Search ............... 166/259, 271, 281, 273, 166/274, 307; 252/8.55 C

[56] References Cited

U.S. PATENT DOCUMENTS

| | | | |
|---|---|---|---|
| 2,094,479 | 9/1937 | Vandergrift | 166/271 X |
| 2,300,393 | 11/1942 | Ayers | 252/8.55 C |
| 2,367,350 | 1/1945 | Heigl | 166/307 |
| 2,425,415 | 8/1947 | Bond et al. | 166/307 |
| 2,663,689 | 12/1953 | Kingston et al. | 166/307 X |
| 2,679,294 | 5/1954 | Bond et al. | 166/307 X |
| 2,885,004 | 5/1959 | Perry et al. | 166/307 |
| 3,283,816 | 11/1966 | Bradley et al. | 166/307 X |
| 3,543,856 | 12/1970 | Knox et al. | 166/307 X |

Primary Examiner—Stephen J. Novosad
Assistant Examiner—George A. Suchfield

[57] ABSTRACT

The permeability of a siliceous formation is increased by injecting in sequence, a fluoboric acid solution followed by a mud acid (HCl/HF) solution. The method is particularly advantageous in formations which have a tendency to plug initially upon contact with mud acid, or with HCl commonly used as a preflush ahead of mud acid. When contacted initially with fluoboric acid, such formations show little or no plugging effects when subsequently treated with mud acid.

12 Claims, 4 Drawing Figures

EFFECT OF VARIOUS FLUIDS ON COTTON VALLEY FORMATION

| CURVE | SYSTEM |
|---|---|
| I | 12% HBF$_4$ |
| | 12% HCl + 3% HF |
| II | 12% HBF$_4$ + 2% H$_3$BO$_3$ |
| | 12% HBF$_4$ + 3% HF |
| III | 12% HBF$_4$ |
| | 15% HCl |
| IV | 15% HCl |
| V | 12% HBF$_4$ + 3% HF |
| | 15% HCl |
| VI | 12% HCl + 3% HF |

EFFECT OF HCl AHEAD OF MUD ACID IN COTTON VALLEY FORMATION

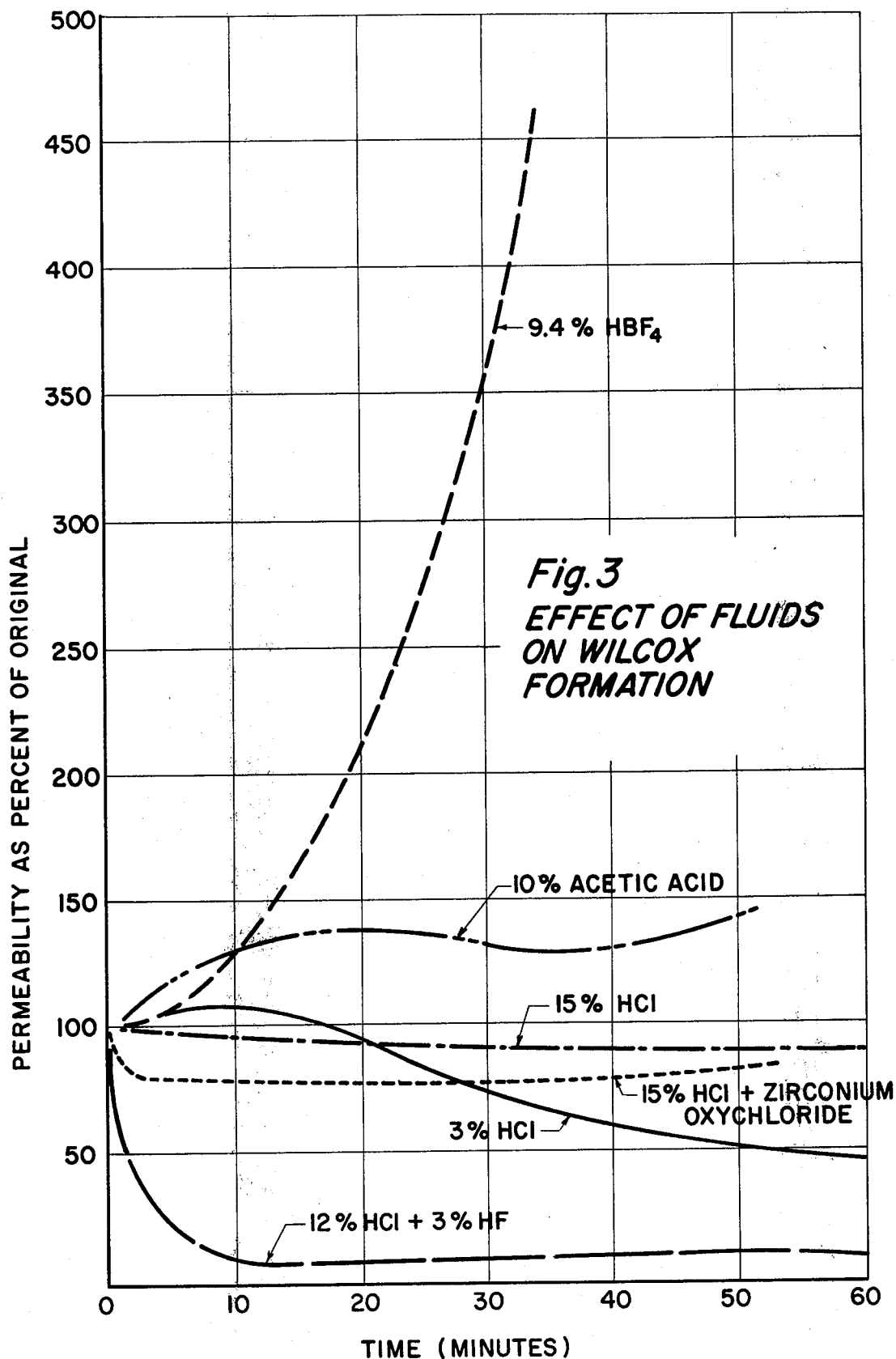
Fig.3 EFFECT OF FLUIDS ON WILCOX FORMATION

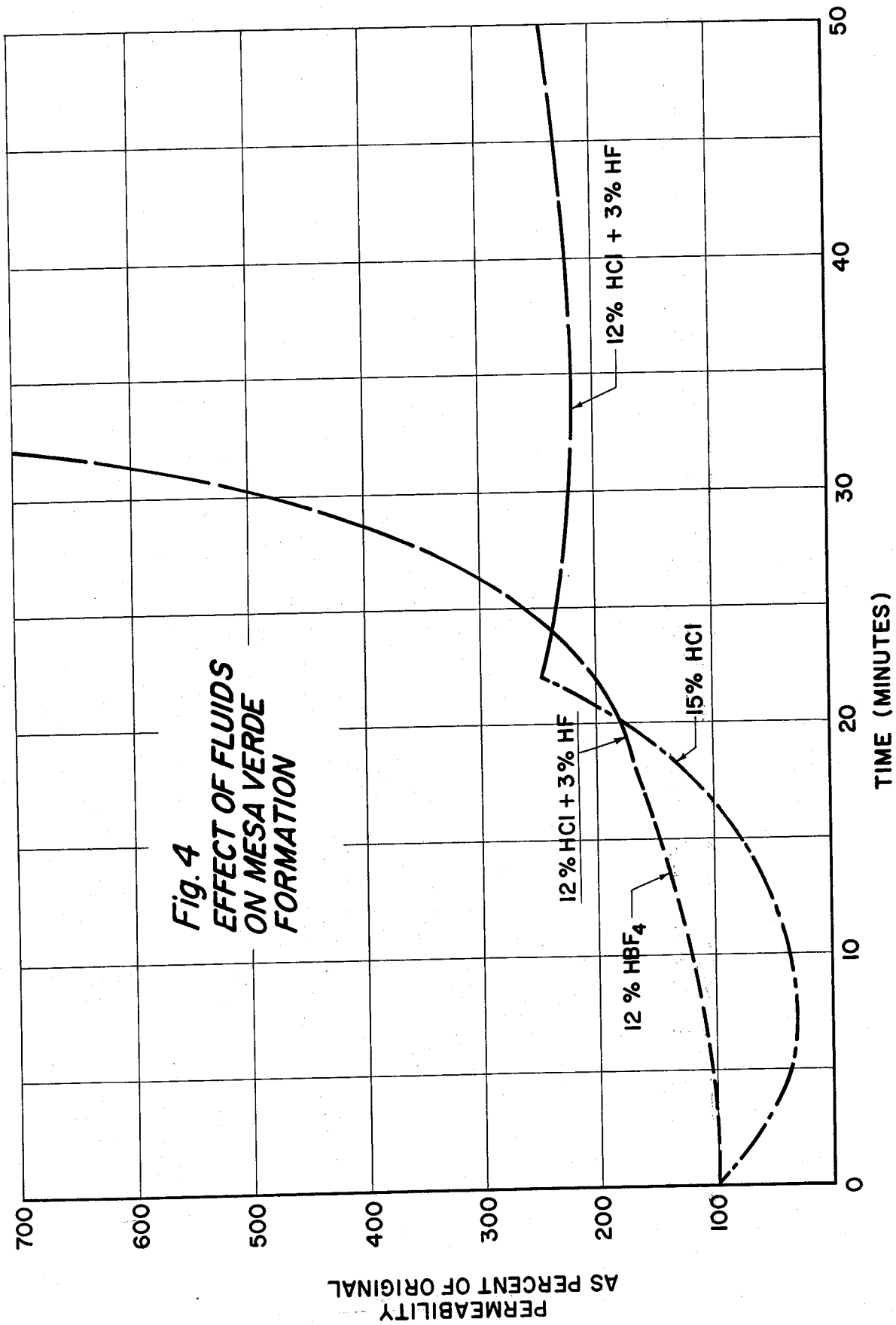

METHOD FOR ACIDIZING A SUBTERRANEAN FORMATION

I. BACKGROUND OF THE INVENTION

A. Field of the Invention

The invention relates to a method for increasing the permeability of a subterranean formation, wherein the permeability increase is achieved by contacting the formation with an acidic solution to dissolve a portion of the formation. It more particularly relates to an acidizing method of the type employing mud acid.

B. Description of the Prior Art

Numerous procedures for treating wells with siliceous-material-dissolving acids are known. A good discussion of the known art is found in columns 1 and 2 of Templeton et al., U.S. Pat. No. 3,828,854 and in the "Introduction" section of Society of Petroleum Engineers Paper No. 5153, which paper relates to the same invention as the Templeton et al. patent.

Conventionally, siliceous formations have been acidized by contact with mud acid. As used herein, "mud acid" refers to an aqueous solution of hydrofluoric acid and at least one of hydrochloric acid, acetic acid or formic acid; usually, the acid in addition to HF is HCl. As is well understood in the art, the derivation of the HCl and HF is not critical, so that "mud acid" also includes aqueous solutions of chemicals which quickly react to form HCl and HF, i.e., so that by the time the solution reaches the formation, the active ingredients are HF and HCl. The respective concentrations of HCl and HF may vary over wide ranges, with the lower limits being more a matter of practicality rather than operability, and the upper limits being a matter of mutual solubility of the two acids. Thus, any given mud acid solution may have an HCl concentration, by weight, of from about 1 percent or even less up to about 37 percent, and an HF concentration of from about 0.5 percent or even less up to about 25 percent, though as the upper limit is approached for one species, a lesser concentration of the other may be required because of solubility limitations. Most typically, a mud acid is substantially free of other acidic species, consisting substantially of from about 3 to about 25 percent HCl and about 1 to about 10 HF.

In carrying out a mud acidizing treatment, it is fairly common, but not essential, to precede the mud acid with a preflush of aqueous HCl dissolve carbonates in the formation.

In some formations, however, the injection of strong acids such as HCl or mud acid causes a loss in formation permeability and a decrease in well production. Heretofore, such formations could not be beneficially treated with mud acid.

As further background, the use of fluoboric acid in well treating has been previously described. Ayers, Jr., U.S. Pat. No. 2,300,393 teaches treatment with fluoboric acid, optionally with small amounts of HF. Ayers, Jr., warns against using large excesses of HF "as clogging of the treated formation may occur". The clay dissolving efficiency of fluoboric acid alone, however, is relatively poor due to its limited degree of hydrolysis. Ayers, Jr., also teaches the fluoboric acid may be followed by HCl containing no appreciable amount of hydrofluoric acid, or optionally, by a mixture of HCl and fluoboric acids. Bond et al., U.S. Pat. No. 2,425,415 teaches an acidizing procedure wherein the formation is first contacted with a fluoboric acid solution which contains no free HF, but which contains an excess of boric acid, and thereafter with aqueous fluoboric acid containing excess HF. Kingston et al., U.S. Pat. No. 2,663,689 describes the use of boric acid in aqueous HCl-HF to avoid precipitation of insoluble fluoride salts and fluorosilicic acid.

II. BRIEF DESCRIPTION OF THE DRAWINGS

FIGS. 1-4 contain plots of the data obtained in Series One through Four respectively as hereinafter described under caption V.

III. SUMMARY OF THE INVENTION

The present invention is a method for increasing the permeability of a subterranean formation by injecting fluoboric acid into the formation as a preflush prior to injection of a mud acidizing solution. The method is particularly effective for stimulating formations of the type which otherwise suffer a decrease in permeability upon initial contact with conventional acidizing solutions of the type containing primarily HCl or primarily a mixture of HCl and HF. By treating such a formation according to the present invention, the characteristic initial reduction in permeability upon contact with the HCl or with the mud acid is prevented, thereby permitting the mud acid to more effectively stimulate the formation.

IV. FURTHER DESCRIPTION OF THE INVENTION

The fluoboric acid solution may be prepared in any convenient manner. Ayers, U.S. Pat. No. 2,300,393, for example, teaches preparation of fluoboric acid by mixing boric and hydrofluoric acids. Alternatively, boric acid may be added to ammonium fluoride or ammonium bifluoride in the presence of an approximately stoichiometric amount of HCl. For example, an approximately 8 weight percent solution of fluoboric acid may be prepared by admixing the following:

|  | U.S. | Metric |
| --- | --- | --- |
| Water | 340 gal | 1.36 m$^3$ |
| Ammonium bifluoride | 500 lb | 240 kg |
| 35 wt % HCl | 97 gal | 0.388 m |
| Boric acid | 250 lb | 120 kg |
| Total, approximately | 500 gallons | 2 m$^3$ |

Other variations will be readily apparent to those skilled in the art. For example, another suitable fluoboric acid solution may be prepared employing a mixture of HCl and HF as starting materials, e.g., by admixing the following:

|  | U.S. | Metric |
| --- | --- | --- |
| Water | 370 gal | 1.48 m$^3$ |
| Ammonium bifluoride | 250 lb | 120 kg |
| Aqueous soln. of, by weight, 25% HCl and 20% HF | 84 gal | 0.366 m$^3$ |
| Boric acid | 250 lb | 120 kg |
| Total, approximately | 500 gallons | 2 m$^3$ |

The concentration and quantity of fluoboric acid solution employed is not sharply critical, so long as each is sufficient so that the preflush prevents the permeability of the formation from decreasing upon injection of the mud acid. Generally, however, solutions of from about 1 weight percent or less up to about 48 weight percent $HBF_4$ may be employed. More preferably, the fluoboric acid solution contains from about 2 to about 20 weight percent $HBF_4$. Preferably, the fluoboric acid solution consists substantially of fluoboric acid, i.e., optionally including functional additives such as a corrosion inhibitor, but containing (when injected) less than about 2% HCl and less than about 1% HF.

A sufficient volume of the fluoboric acid solution is preferably employed to obtain penetration of at least about 3 to 4 feet into the formation from the wellbore. Those skilled in the art can determine the approximate volume to use for a given depth of penetration if the porosity is known. Generally, however, about 85–100 gallons per foot (about 1–1.25 m³/m) of perforations is suitable.

Injection of the fluoboric acid is carried out at a matrix rate, i.e., a rate which is less than that required to fracture the formation. Preferably, an injection rate of about ½ barrel (42 gallon barrel) per 4 feet of perforations (about 33 liters/meter of perforations) is maintained to assure that migratory fines are not disturbed during the injection.

Injection of the mud acid may immediately follow injection of the fluoboric acid if desired, but preferably, the well is shut in for at least a brief period to allow the fluoboric acid to react with clays in the formation prior to injecting the mud acid, particularly at formation temperatures of about 180° F. (82° C.) and less. Optimum results are achieved when the following minimum shut-in time is used, depending on the bottom hole static temperature (BHST) of the well.

| BHST | | Preferred Minimum Shut-in Time |
|---|---|---|
| ° F. | ° C. (calculated from ° F.9 | Minutes |
| 100 | 38 | 5 hours |
| 110 | 43 | 4 hours |
| 120 | 49 | 3 hours |
| 130 | 54 | 2 hours |
| 140 | 60 | 1½ hours |
| 150 | 65 | 1 hour |
| 160 | 71 | 30 minutes |
| 170 | 77 | 20 minutes |
| 180 | 82 | 10 minutes |

When so employed, the fluoboric acid prevents initial formation damage upon injection of the mud acid. The fluoboric acid also helps to dissolve carbonates in the formation, so that there is no need to pretreat the formation with HCl prior to the mud acid as is often done as part of a mud acidizing treatment.

Following injection of the fluoboric acid, and the shut in period, if any, mud acid is injected at a matrix rate, and the remainder of the treatment carried out as in any typical mud acidizing treatment. The mud acid employed may be any conventional mud acid, as hereinabove described under the "Background of the Invention" caption.

Optionally, other functional additives, such as corrosion inhibitors, diverting agents, surfactants, and the like may be employed in the fluoboric acid solution, the mud acid, or in both.

V. EXAMPLES AND COMPARISON RUNS

The practice of the present invention and its advantages over the prior art are further illustrated by the following examples and comparison runs. All percentages are weight percent.

SERIES ONE

A series of tests employing various acids was carried out on cores from the Cotton Valley formation. Results as a percent of initial permeability to API brine with a 700–800 psi back pressure and about a 500 psi pressure differential during injection steps. In tests where acids were injected in two separate stages, the first stage was shut-in for about 1–½ hours; thus the "Time" axis in FIG. 1 represents only actual injection time. Test conditions were as follows:

| FIG. 1 Curve Identification | Solution(s) Injected | Time Period Injected (min) | Pore Volumes Injected | Core Lengths (1" diameter) |
|---|---|---|---|---|
| I | 12% $HBF_4$ | 0–12 | 39 | 1" |
|  | 12% HCl + 3% HF | 12–18 | 60 |  |
| II | 12% HBF + 2% $H_3BO_3$ | 0–16 | 36 | 1" |
|  | 12% $HBF_4$ + 3% HF | 16–26 | 40 |  |
| III | 12% $HBF_4$ | 0–9 | 40 | 1" |
|  | 15% HCl | 9–27 | 61 |  |
| IV | 15% HCl | 0–60 | 12 | 3" |
| V | 12% $HBF_4$ + 3% HF | 0–20 | 44 | 1" |
|  | 15% HCl | 20–40 | 44 |  |
| VI | 12% HCl + 3% HF | 0–60 | 12 | 3" |

Where two acid systems were injected, an attempt was made to inject approximately 40 pore volumes (±10%) of the first fluid, yet it can be seen from Curve IV that HCl was not a suitable preflush for this formation since the core permeability declined initially and even after an hour, only about 12 pore volumes had been injected. Similarly, injection of mud acid without a preflush (Curve VI) caused an immediate and nearly total loss of permeability. Curve I shows the results obtained according to the present invention in contrast to results obtained using fluoboric acid in various combinations with other acids (Curves II, III, and V).

SERIES TWO

Figure 2:
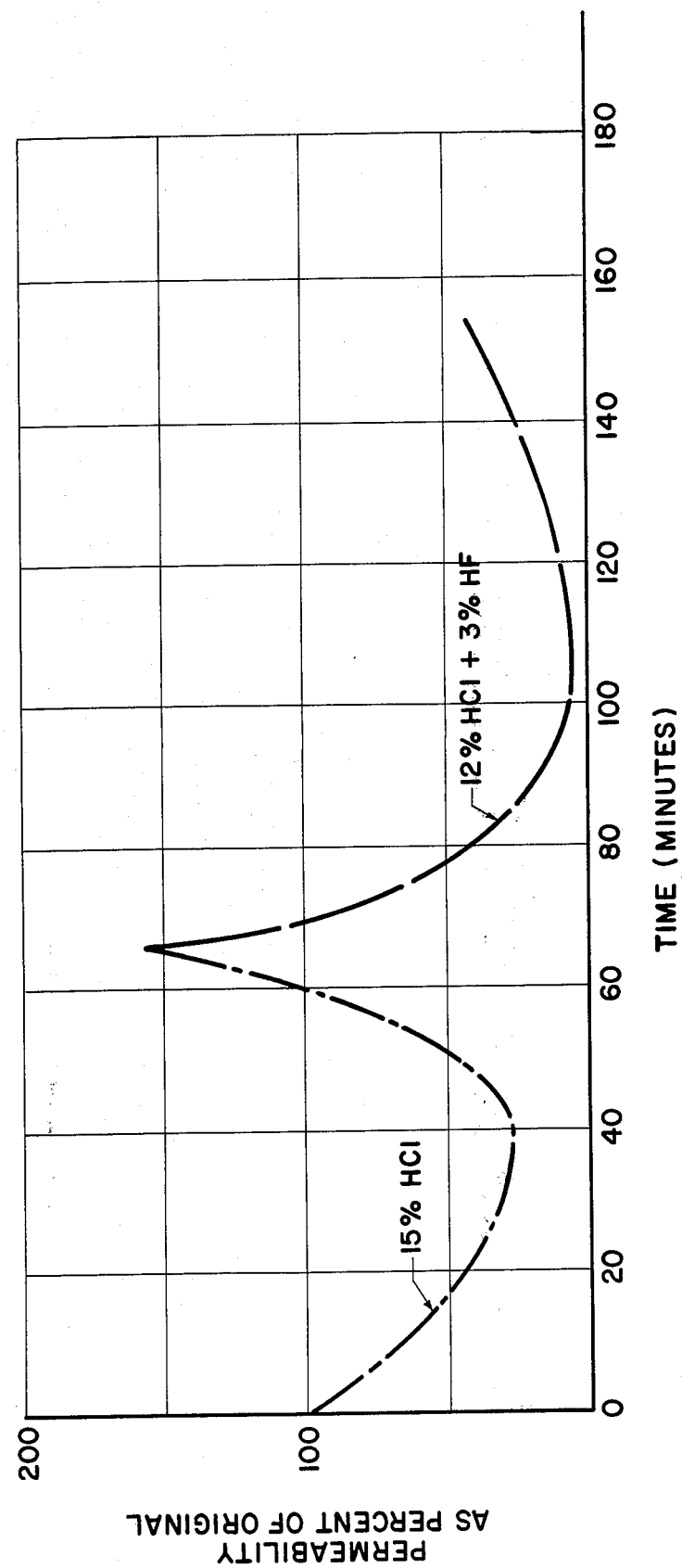

FIG. 2 shows the effect on permeability on a 3-inch by 1-inch diameter Cotton Valley core treated with 15 pore volumes of a conventional 15% HCl preflush ahead of 5 pore volumes of mud acid. The test was carried out in substantially the same manner as in Series One, except that the mud acid was injected immediately after the HCl solution, rather than after a shut-in period. As can be seen from the curve, the HCl caused an immediate decline in permeability, and did not prevent the mud acid from also causing a permeability decline. Similar results were realized on other tests where the HCl preflush was shut in for a period of time prior to injection of the mud acid.

SERIES THREE

FIG. 3 shows the results of tests on 3-inch by 1-inch diameter Wilcox formation cores using various acid solutions as labeled in FIG. 3. Reference permeabilities were determined using 2% KCl for all cores except that subsequently treated with the fluoboric acid; for that core, initial permeability was determined using $NH_4Cl$ since potassium ions in the presence of fluoboric acid can cause formation of a precipitate. Tests were carried out at a pressure differential of about 250 psi against a back pressure of about 800 psi.

SERIES FOUR

A fourth series of tests was run on 3-inch by 1-inch diameter cores from the Mesa Verde formation having an initial permeability to API brine of about 34 millidarcies. In one core, a 12% fluoboric acid solution was injected for 18 minutes, whereupon injection of a 12% HCl/3% HF mud acid was begun. In the second core, a 15% HCl solution was injected for 22 minutes, whereupon injection of a 12% HCl/3% HF mud acid was begun. Results of these tests are plotted in FIG. 4, which shows the fluoboric acid and mud acid sequence was more effective in increasing the permeability of the formation than was the hydrochloric acid and mud acid sequence. The fluoboric acid solution was shut in for an hour and a half prior to injection of the mud acid, whereas the HCl was not; however, based on other tests, it is not believed the lack of a shut-in period following the HCl stage materially affected the qualitative performance of the HCl-mud acid run.

What is claimed is:

1. A method for stimulating a water sensitive formation, which formation is characterized as being of the type which suffers a decrease in permeability upon initial contact with conventional HCl or mud acid acidizing solutions, which comprises:
   (a) contacting said formation with a preflush comprising an aqueous solution of fluoboric acid; and
   (b) thereafter contacting said formation with an aqueous mud acidizing solution.

2. The method of claim 1 which comprises:
   (a) contacting said formation with a preflush consisting substantially of aqueous fluoboric acid; and
   (b) thereafter contacting said formation with an acidizing solution consisting substantially of HCl and HF.

3. The method of claim 1 wherein a period of time is allowed to elapse between steps (a) and (b) to permit the fluoboric acid to react with the formation.

4. A method of increasing the permeability of a siliceous formation which comprises injecting in sequence into said formation via a wellbore
   (a) an aqueous solution of fluoboric acid; and
   (b) an aqueous solution containing from about 1 to about 37 weight percent HCl and about 0.5 to about 25 weight percent HF, the concentration and quantity of (a) being sufficient to prevent an initial decrease in formation permeability upon injection of (b) and the quantity of (b) being sufficient to further increase the formation permeability over that obtained by injection of (a).

5. The method of claim 4 wherein the concentration of the fluoboric acid solution is from about 1 to about 48 weight percent $HBF_4$.

6. The method of claim 5 wherein the concentration of the fluoboric acid solution is from about 2% to about 20% and the concentration of the HCl/HF solution is from about 3 to about 25% HCl and 1 to about 10% HF.

7. The method of claim 6 wherein the well is shut in for a period of time between steps (a) and (b).

8. The method of claim 4 which comprises sequentially injecting into said formation, an aqueous solution consisting substantially of from about 1 to about 48 percent fluoboric acid and a second solution consisting substantially of from about 3 to about 25 weight percent HCl and about 1 to about 10 weight percent HF.

9. The method of claim 8 wherein each of said solutions contains a corrosion inhibitor.

10. The method of claim 8 wherein the fluoboric acid solution contains about 2 to about 20 weight percent $HBF_4$, and the second solution contains about 12 weight percent HCl and about 3 weight percent HF.

11. The method of claim 10 wherein the static temperature of the formation is about 180° F. or less and the well is shut in for a period of time between steps (a) and (b).

12. The method of claim 4 wherein each acid solution contains a corrosion inhibitor, and wherein the well is shut in for a period of time between steps (a) and (b).

* * * * *

UNITED STATES PATENT AND TRADEMARK OFFICE
CERTIFICATE OF CORRECTION

PATENT NO. : 4,151,878
DATED : May 1, 1979
INVENTOR(S) : Ronnie L. Thomas

It is certified that error appears in the above-identified patent and that said Letters Patent are hereby corrected as shown below:

Col. 1, line 48, after "HCl" insert --to--.

Col. 2, line 45, under the heading "Metric" delete "0.388 m" and insert --0.388 $m^3$--.

Col. 3, line 19, delete "1/2" and insert --1/4--.

Col. 3, under heading "°C. (calculated from °F.9", delete "°F.9" and insert --°F.)--.

Signed and Sealed this

Eighteenth Day of September 1979

[SEAL]

Attest:

Attesting Officer

LUTRELLE F. PARKER
Acting Commissioner of Patents and Trademarks